UNITED STATES PATENT OFFICE.

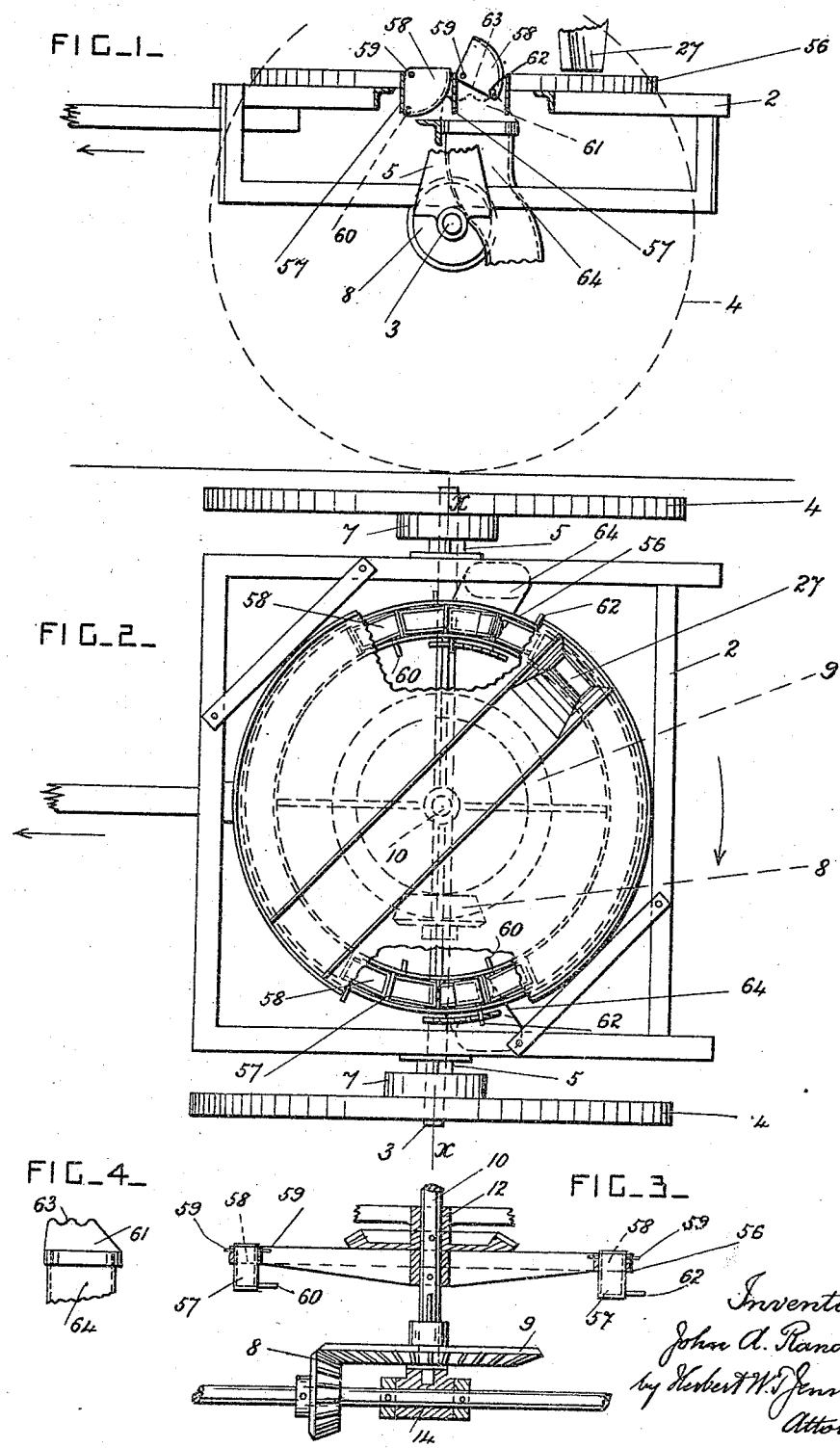
J. A. RANDALL.
DROPPER WHEEL.
APPLICATION FILED SEPT. 3, 1918.
1,294,703. Patented Feb. 18, 1919.

JOHN A. RANDALL, OF MINNEAPOLIS, MINNESOTA.

DROPPER-WHEEL.

1,294,703. Specification of Letters Patent. Patented Feb. 18, 1919.

Original application filed November 21, 1916, Serial No. 132,547. Divided and this application filed September 3, 1918. Serial No. 252,369.

*To all whom it may concern:*

Be it known that I, JOHN A. RANDALL, a citizen of the United States, residing at Minneapolis, in the county of Hennepin and State of Minnesota, have invented certain new and useful Improvements in Dropper-Wheels, of which the following is a specification.

This application is a division of the application for Letters Patent for a potato planter filed by me on Nov. 21, 1916, Serial Number 132,547.

This invention relates to dropper wheels used on planters for potatoes and other similar machines; and it consists in the novel construction and combination of the parts hereinafter fully described and claimed, whereby the seeds are received from the selector mechanism and are conveyed to the chutes of the furrow opening devices.

In the drawings, Figure 1 is a side view of portions of a potato planter provided with a dropper wheel according to this invention, certain portions of the dropper wheel being shown in section. Fig. 2 is a plan view of the dropper wheel, with some of the buckets omitted. Fig. 3 is a vertical section through the dropper wheel, taken on the line $x$—$x$ in Fig. 2. Fig. 4 is a detail side view of one of the inclined plates 61.

The planter has a frame 2 which is supported by means of brackets 5 on an axle 3 having ground wheels 4, and is drawn along in any approved way. The ground wheels are connected with the axle by ratchet mechanisms of any approved construction, which are inclosed in suitable housings 7, and which are not illustrated as they are not a part of the present invention.

A toothed wheel 8 is secured on the axle, and is revolved by it when the machine is drawn along in a forward direction, and this wheel 8 gears into a toothed wheel 9 secured on a vertical shaft 10, which is journaled in a bearing 12 secured to the frame 2, and in a footstep 14 supported by the axle. Any other approved mechanism may be used for driving the vertical shaft, and it may be thrown into and out of gear or action in any approved way. The arrows in Fig. 2 show the directions of motion.

The selector mechanism or feed mechanism is of any approved construction, and is preferably that shown in the hereinbefore mentioned application, Serial Number 132,547, and it is provided with a single discharge spout 27 which is supported by the frame, and is preferably arranged at the rear part of the machine. The seeds or seed sections slide down the discharge spout, one by one, into the dropper wheel.

The dropper wheel 56 is arranged to revolve in a horizontal plane, and it is secured on the upper end portion of the vertical shaft 10. The dropper wheel is arranged to plant two rows simultaneously, and it carries a series of vertical plates 57 arranged radially of its center, and at its periphery. The dropper wheel is provided with a series of buckets 58 which are pivoted to it by pins 59, and which are open at the top and at one end. These buckets are arranged so that they assume their closed positions by gravity, each pressing its open end against one of the vertical plates 57. The bucket is tilted by suitable mechanism, and as shown in Fig. 1, so that the seed may drop from its open end when the same is removed from the plate 57.

The buckets are revolved under the discharge spout 27 in the direction of the curved arrow in Fig. 2. The buckets 58 are provided with tripping pins 60 and 62, arranged upon opposite sides of the alternate buckets.

The pins 60 are on the inner sides, and the pins 62 are on the outer sides of the buckets. Inclined plates 61 having serrations or corrugations 63 at their upper parts are supported by the frame 2, and are arranged on the opposite sides of the machine, so that when one pin 60 runs up one plate 61, the pin 62 on the opposite side of the dropper wheel runs up the other inclined plate 61.

Discharge chutes or tubes 64 are provided, and are supported in the frame, and are arranged at opposite sides of the dropper wheel, so that they receive the seeds which fall from the buckets when the latter are tilted. These discharge chutes or tubes have furrow openers of any approved construction connected to their lower ends, and these furrow openers and the means for covering the seeds are preferably those shown and described in the aforesaid application Serial Number 132,547, but any other approved devices may be used.

The seeds or seed sections are delivered one by one down the feed or discharge spout into the buckets of the dropper wheel which are timed to receive them as they drop from the spout. The dropper wheel drops a seed at each side of the machine simultaneously when its buckets are tilted by the inclined plates 61. The serrations or corrugations 63 on the said plates are provided and arranged so as to jar or agitate the buckets as they pass over them in order to assure the dropping of the seeds after the buckets have been tilted. The buckets are arcuate in shape, and their pivots are arranged adjacent to the tops of the vertical plates 57, which normally close the open sides of the buckets, and the buckets are tilted to discharge the seeds by tilting them vertically upward.

What I claim is:

1. A horizontally arranged dropper wheel provided at its periphery with pivoted buckets, two dropper chutes supported under the buckets at opposite sides of the dropper wheel, means for tilting each alternate bucket at each chute so that they discharge the seeds into the appropriate chutes, a single delivery or feeding device common to all the buckets, and means for revolving the dropper wheel.

2. A horizontally arranged dropper wheel provided with substantially vertical plates at its periphery, arcuate buckets open at the top and on one side and pivoted to the said wheel adjacent to the said plates and having their open sides normally closed by the said plates, and means for tilting the buckets upwardly at predetermined positions of the wheel so as to open them and discharge their contents.

3. A horizontally arranged dropper wheel provided with pivoted arcuate buckets at its periphery which are normally held in a closed position by gravity, and means for opening the buckets at predetermined positions of the wheel.

4. A horizontally arranged dropper wheel provided with pivoted arcuate buckets at its periphery which are normally held in a closed position by gravity and which are provided with tripping projections, and an inclined tripping plate arranged in the path of the said projections and provided with serrations, said plate operating to open the buckets and then agitate them to free their contents.

5. A dropper wheel provided with a series of buckets, and a tripping device provided with an inclined portion and a serrated portion, said tripping device operating to open the buckets and then agitate them to free their contents.

6. A horizontally arranged dropper wheel provided with pivoted arcuate buckets at its periphery which are normally held in a closed position by gravity and which are provided with tripping projections, two dropper chutes supported under the buckets at opposite sides of the dropper wheel, and inclined tripper plates arranged adjacent to the said chutes, each tripper plate being arranged in the path of the tripping projections which project from alternate buckets and operating to open the said alternate buckets so that they discharge their contents into the appropriate chute.

In testimony whereof I have affixed my signature.

JOHN A. RANDALL.

Copies of this patent may be obtained for five cents each, by addressing the "Commissioner of Patents, Washington, D. C."